May 23, 1933.　　　　　G. O. HOY　　　　　1,910,834
AIR COOLED INTERNAL COMBUSTION ENGINE
Filed March 12, 1931　　　2 Sheets-Sheet 1
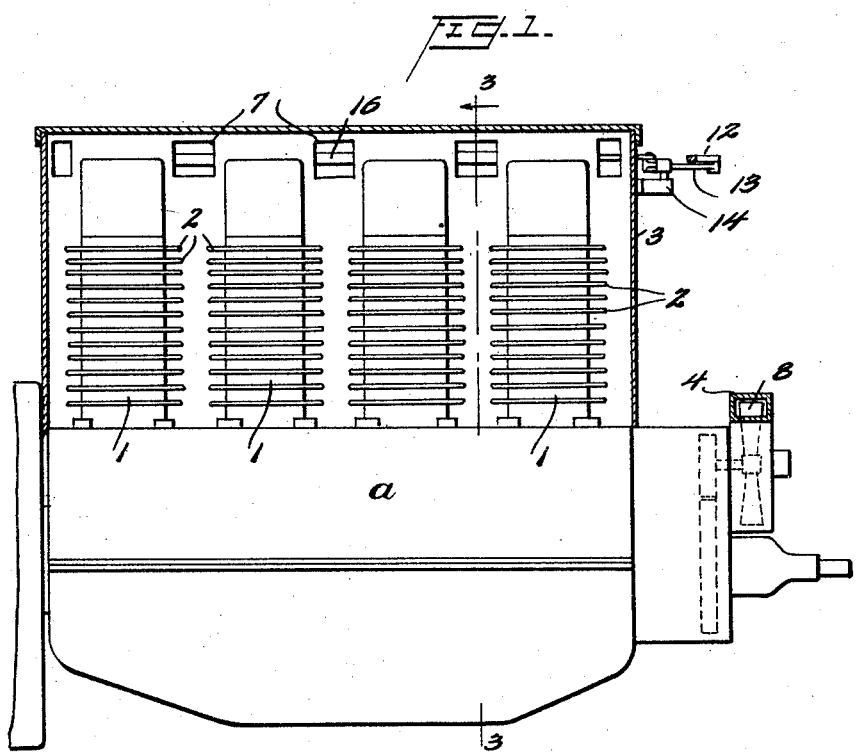
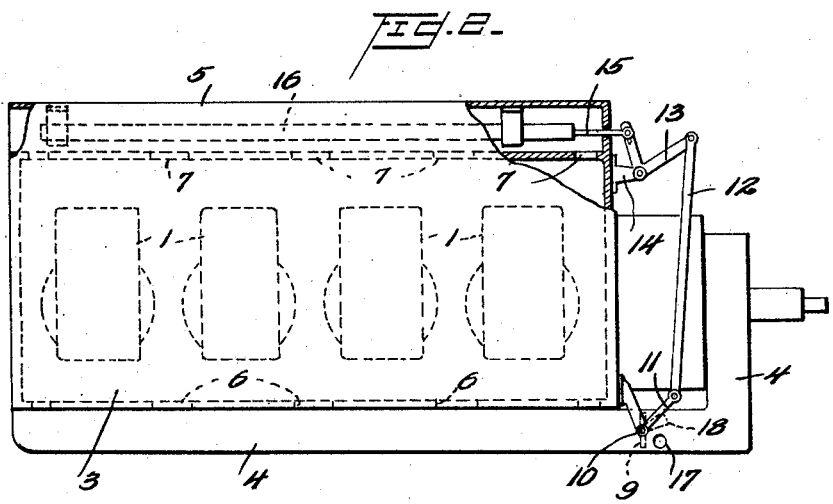
INVENTOR.
George O. Hoy
BY Charles W. Clement
ATTORNEYS.

May 23, 1933. G. O. HOY 1,910,834
AIR COOLED INTERNAL COMBUSTION ENGINE
Filed March 12, 1931  2 Sheets-Sheet 2
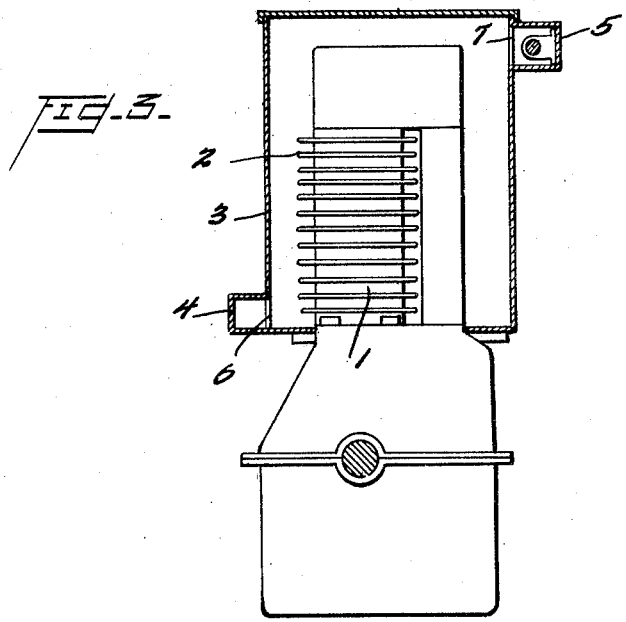
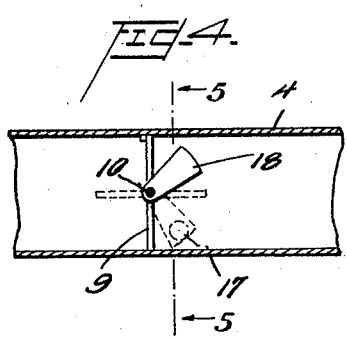
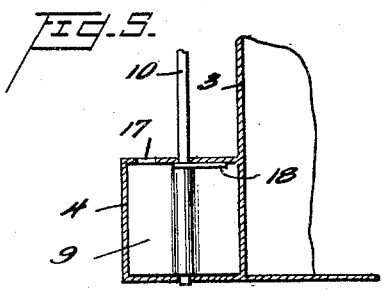

Patented May 23, 1933

1,910,834

UNITED STATES PATENT OFFICE

GEORGE O. HOY, OF SHAMOKIN, PENNSYLVANIA

AIR COOLED INTERNAL COMBUSTION ENGINE

Application filed March 12, 1931. Serial No. 522,084.

This invention relates to means for automatically controlling the flow of air around the cylinders of air cooled internal combustion engines. In carrying out the invention, I provide a housing which encloses the cylinders of the engine, a passageway for admitting air to the lower part of this housing, and a passageway for permitting the air to escape from the upper part of the housing. In the air inlet passageway I provide a damper, and in the air escape passageway I provide a thermostat, which latter is connected to the damper so as to cause the damper to gradually open as the temperature of the air in the housing and outlet passageway increases, thereby admitting a greater volume of cool air to the housing; and as the temperature in the housing and outlet passageway decreases the thermostat causes the damper to move toward closed position, thus decreasing the inflow of cool air to the housing.

In the accompanying drawings,

Fig. 1 is a side elevation of an air cooled internal combustion engine embodying the invention, the casing enclosing the cylinders being shown in central vertical section;

Fig. 2 is a top plan view of the same, partly broken away;

Fig. 3 is a section on the line 3—3 of Fig. 1;

Fig. 4 is a horizontal section through the air inlet passageway, showing the valve or damper; and, Fig. 5 is a section on the line 5—5 of Fig. 4.

Referring to the drawings, *a* indicates an internal combustion engine having spaced cylinders 1, provided with the usual radiating fins 2. These cylinders are enclosed in a housing 3, within which the air is free to circulate around each cylinder. An air inlet passageway 4 extends along the lower part of the casing at one side thereof, and an air outlet passageway 5 extends along the upper part of the casing at the opposite side thereof. Spaced openings 6 lead from the passageway 4 to the casing, and spaced openings 7 lead from the casing to the passageway 5. A fan 8, operated by the engine, forces air into the passageway 4 from whence it is distributed through the spaced openings 6 into the casing. The air after circulating around the cylinders passes through the spaced openings 7 into the outlet passageway 5 and from thence to the atmosphere.

In order to control the temperature of the air within the casing, I provide a valve or damper 9 in the inlet passageway which controls the volume of cool air flowing to the casing or housing surrounding the cylinders. This damper is mounted upon a rod 10, which extends upwardly, and is provided at its upper end with an arm 11 which is connected by a rod 12 to one arm of a bell crank lever 13, mounted upon a bracket 14 at the front of the housing. The other arm of the lever is connected by a rod 15 to a thermostat bar 16, which extends longitudinally in the air outlet passageway 5. An opening 17 is provided in the bottom of the passageway 4 in advance of the damper 9, and a valve 18, secured to the rod 10, is adapted to cover this opening when the damper is in full open position, and to uncover the opening as the damper moves to closed position.

When the engine is stopped and cold, the damper 9 extends across the inlet passageway 4. In this position it does not entirely close the passageway. When the engine is started, the fan blows air into the forward end of the passageway 4 and the most of this passes out through the passageway 17. As the engine cylinders become heated the air surrounding the cylinders becomes heated and flowing out through the passageway 5 heats the thermostat bar and the latter expands, causing the bell crank 13 to rock and move the rod 10 so that the damper 9 will open gradually and admit more air to the casing which surrounds the cylinders. It will be evident that as the engine becomes hotter, the damper will open wider and admit more air so that the control of the temperature of the air in the housing will be automatic.

What I claim is:

1. The combination with a multi-cylinder internal combustion engine having spaced cylinders, of a casing enclosing the cylinders, an air inlet passageway extending longitudinally of the casing and having spaced openings communicating with the lower part of the casing, a fan for blowing air into said passageway, a damper in said passageway for controlling the inlet of air to the casing, an air outlet passageway extending longitudinally of the casing and having spaced openings communicating with the upper part of the casing, a thermostat in said outlet passageway, and connections between said thermostat and damper for operating the latter.

2. The combination with a multi-cylinder internal combustion engine having spaced cylinders, of a casing enclosing the cylinders, an air inlet passageway extending along the casing at one side thereof and having openings communicating with the casing, a fan for blowing air into said passageway, a damper in said passageway for controlling the inlet of air to the casing, an air outlet passageway extending along the casing at the opposite side from the air inlet passageway and having openings communicating with the casing, a thermostat in said outlet passageway, and connections between said thermostat and damper for operating the latter.

3. The combination with a multi-cylinder internal combustion engine having spaced cylinders, of a casing enclosing the cylinders, an air inlet passageway extending along the lower part of the casing at one side thereof and having openings communicating with the casing, a fan for blowing air into said passageway, a damper in said passageway for controlling the inlet of air to the casing, an air outlet passageway extending along the upper part of the casing at the opposite side from the air inlet passageway and having openings communicating with the casing, a thermostat in said outlet passageway, and connections between said thermostat and damper for operating the latter.

In testimony whereof I hereunto affix my signature.

GEORGE O. HOY.